US012724711B2

(12) United States Patent
Lotlikar et al.

(10) Patent No.: US 12,724,711 B2
(45) Date of Patent: Sep. 1, 2026

(54) CACHE COHERENCY MANAGEMENT IN MULTI-LEVEL COHERENT SYSTEM

(71) Applicant: Baya Systems, Inc., Santa Clara, CA (US)

(72) Inventors: Swapnil Lotlikar, San Jose, CA (US); Joji Philip, San Jose, CA (US)

(73) Assignee: BAYA SYSTEMS, INC., Santa Clara, CA (US)

( * ) Notice: Subject to any disclaimer, the term of this patent is extended or adjusted under 35 U.S.C. 154(b) by 28 days.

(21) Appl. No.: 18/750,456

(22) Filed: Jun. 21, 2024

(65) Prior Publication Data

US 2025/0390432 A1 Dec. 25, 2025

(51) Int. Cl.
*G06F 12/08* (2016.01)
*G06F 12/0811* (2016.01)
*G06F 12/0891* (2016.01)

(52) U.S. Cl.
CPC ...... *G06F 12/0811* (2013.01); *G06F 12/0891* (2013.01)

(58) Field of Classification Search
CPC .......................... G06F 12/0811; G06F 12/0891
See application file for complete search history.

(56) References Cited

U.S. PATENT DOCUMENTS

| | | | | |
|---|---|---|---|---|
| 2015/0058569 A1* | 2/2015 | Bronson | G06F 12/0833 | 711/122 |
| 2019/0087344 A1* | 3/2019 | Hijaz | G06F 12/128 | |
| 2020/0371934 A1* | 11/2020 | Chachad | G06F 12/0811 | |
| 2025/0298618 A1* | 9/2025 | Speier | G06F 9/3834 | |

* cited by examiner

*Primary Examiner* — Masud K Khan
(74) *Attorney, Agent, or Firm* — Procopio, Cory, Hargreaves & Savitch LLP

(57) ABSTRACT

A method for cache coherency management in multi-level cache systems includes, for occurrence of a conflict eviction from a set of a cache at a first level from the multi-level coherent system, selecting a victim line from the set of the cache for eviction. For the victim line being dirty and a second level from the multi-level coherent system having a copy of the victim line, the method includes writing data to a third level from the multi-level coherent system using a cache maintenance operation, and silently dropping the victim line without notification to the third level. The second level is a level directly lower than the first level, and the third level is a level directly higher than the first level.

15 Claims, 6 Drawing Sheets

Single Cache

Three-Level Cache Organization

CACHE COHERENCY MANAGEMENT IN MULTI-LEVEL COHERENT SYSTEM

BACKGROUND

Technical Field

Methods and example implementations described herein are generally directed to cache coherency management, and more specifically, to cache coherency management in multi-level coherent system.

Related Art

In related art computer systems, instructions and data were stored and fetched from a main storage by a memory management system for execution or use by a central processor unit, or possibly by some special function unit, such as a floating-point processor. In a few systems, some instructions and data may be retained after their use in a cache memory, which can be accessed more quickly than the main storage. As a result, such instructions and data can be reused later in the execution of the same program. This related art scheme improves the execution performance of the computer system by reducing the time taken to fetch the instructions and data for processing by the central processing unit.

In related art computer systems that have cache memories, the number of cycles required to retrieve an instruction or a data item depends on whether the data item is already in the cache or not, and on how many instructions are required to address or retrieve the data item. If the data item is not in the cache (e.g., a "cache miss"), the instruction or data item must be fetched from main memory, which consumes some number of Central Processing Unit (CPU) cycles. If the data item is in the cache, some CPU cycles will also be consumed, although the consumed instruction cycles will be fewer than in the case of a cache miss. Nevertheless, any improvement that can be made in the processing of cached data and instructions is useful. In certain circumstances, the improvement may make a considerable difference to the processing performance of the system.

FIG. 1(*a*) and FIG. 1(*b*) illustrate cache memory architectures 100 and 110 respectively, showing placement of cache memory in the hardware layout. As illustrated, cache 104 is positioned between CPU 102 and main memory 106. Data block access from the cache 104 is faster when compared with access of the same data block from the main memory 106, since the cache 104 maintains at least a subset of data stored in the main memory 106 and hence requires fewer instruction cycles. Similarly, FIG. 1(*b*) illustrates multiple caches 114, 116, and 118 configured between CPU 112 and main memory 120.

Most related art caching techniques have a fundamental tradeoff between cache latency and hit rate, where larger caches have better hit rates but longer latency. To address this tradeoff, many computers use multiple levels of cache, with small fast caches backed up by larger, slower caches. Multi-level cache systems generally operate by checking the smallest level 1 (L1) cache 114 first. If a hit occurs in L1, the processor proceeds at high speed. If the smaller cache misses, the next larger cache 116 (L2) is checked, and so on to L3 cache such as 118, before external/main memory 120 is checked. Throughout the specification, caches at levels higher thereto are referred to as higher-level caches (for example, L4 is a higher-level cache with respect to L3), and caches at levels lower thereto are referred to as lower-level caches (for example L2 and L1 are lower-level caches with respect to L3).

FIG. 2(*a*) illustrates structural layout of a way 200. Each cache may include one or more ways. As is illustrated, the way 200 includes a plurality of cache lines, each having a block with K words that store data from the memory. Each cache line also includes a tag that identifies the block being stored. The tag stores an address, which may be a pointer to the location of the blocks/data in the memory. As illustrated, the way 200 includes C blocks (numbered from 0 to C−1), which is less than the number of blocks, say M, of the main memory. FIG. 2(*b*) illustrates architectural layout of interactions 250 between cache 254, processor 252, and system bus 260 through address buffer 256 and data buffer 258. As represented, the processor 252 sends address level instructions to the cache 254 to identify the location of data block that is to be fetched along with issuing data requests to the cache 254. Address information paths are provided between the processor 252, cache 254, and address buffer 256, whereas data information paths are provided between the processor 252, cache 254, and data buffer 258. The cache 254, address buffer 256, and data buffer 258, all interact through the system bus 260 to receive data blocks and interact with the main memory (not shown).

Typically, a cache is divided into a number of sets of cache lines, where each set includes a fixed number of lines. A data block from main memory can be configured to map to any line in a given set determined by the respective block address. For instance, in case there are "m" number of lines in the cache, "v" number of sets, and "k" number of lines per set, the value of k would be $k=m/v$. In such a case, a main memory block number "j" can be placed in a set "i" based on the equation, $i=j$ modulo v.

Improvements in cache memory performance have been sought using various methods of linking and associating groups of cache lines so as to form a policy that is configured to decide where in the cache a copy of a particular entry of main memory will go. If the policy is free to choose any entry in the cache to hold the copy, the cache is called "fully associative." At the other extreme, if each entry in main memory can go in just one place in the cache, the cache is called "direct mapped." Many caches implement a compromise in which each entry in main memory can go to any one of N places in the cache, and are described as "N-way set associative." For instance, in a 2-way set associative, any particular location in main memory can be cached in either of 2 locations in a data cache. Similarly, in a 4-way set associative, any particular location in main memory can be cached in either of 4 locations in a data cache. Multiple algorithms can be used for determining the location in which the data block can be stored.

A cache miss refers to a failed attempt to read or write a piece of data in the cache, which results in a main memory access with much longer latency. Lowering the cache miss rate is a major area of focus. Therefore, a significant amount of analysis has been done on cache behavior in an attempt to find the best combination of size, associativity, block size, and so on. There can be multiple kinds of cache misses, which can impact the cache and processing performance in different ways. For instance, compulsory misses are those misses that are caused by the first reference to a location in memory. Cache size and associativity make no difference to the number of compulsory misses but prefetching data can help here, as can larger cache block sizes. Capacity misses are those misses that occur regardless of associativity or block size of the cache memory, solely due to the finite size of the cache. Conflict misses, on the other hand, are misses that could have been avoided had the cache not evicted an entry earlier. Conflict misses can be further broken down into mapping misses, that are unavoidable given a particular amount of associativity, and replacement misses, which are due to the particular victim choice of the policy (e.g., such as a replacement policy). The replacement policy, particularly for multi-level cache systems, is chosen based on cache coherency protocol and inclusion policies used by the cache systems.

As shown in FIG. 2(*b*), processors in multi-level cache systems have multiple levels of caches, viz. caches L1, L2, L3, and L4. Further, as shown in architecture 300 of the multi-level cache system in FIG. 3, multiple processors may be configured to access data/blocks from the same caches. As shown, multiple processors, such as Central Processing Unit (CPU) 302-1, 302-2, aside from having corresponding L1 cache 304-1, 304-2 and L2 cache 306-1, 306-2, are configured to the higher-level L3 cache 308-1. The L3 cache 308-1 can be configured to exchange data directly with memory 314, or through an LA cache 312. The LA cache 312 can also be configured to exchange data with L3 cache 308-2, which in turn is connected to caches in devices 310-1, 310-2 that form a network 311 of cores, agents, processing elements, or any combination thereof. In the example shown in FIG. 3, the processor 301 is shown to include two agents/cores, the processor may have any number of cores. Further, the architecture 300 shows a fabric of caches, where clusters of caches at each level (such as L3 caches 308-1, 308-2) are maintained.

The architecture 300 must maintain coherency, i.e. consistency of data in cache lines having tags pointing to the same address in the memory. Cache coherency protocols seek to ensure coherency between caches at the same level, as well as coherency across fabrics. Changes made to the data are propagated to all other copies thereof in each level of cache in the order that they are made. To maintain coherency horizontally and vertically on all levels of caches, the caches are configured to notify/make visible any modifications made to the data to all other caches and the memory.

A coherency protocol is a set of mechanisms to maintain coherence between the caches in the system. Cache coherency can be performed by a software executing on a processor that explicitly writes data back from memory to make it visible to other caches. Other approaches for cache coherency include hardware managed cache coherency, where a set of (finite) state machines remove dirty cache lines and write the data therein back into memory. The state machines define the states of the cache lines in the system, conditions and transition between the states and operations and communications performed during coherent read and write requests.

Coherency of caches can be ensured using the coherency protocol. Typically, caches would maintain a state for each of its cache lines, using finite state machines. The state of the cache lines is shifted when a bus transaction is transmitted/broadcasted through a shared bus that connects the caches with each other, and the memory. Examples of bus transactions include read requests for reading the data in the memory into a cache line, write requests for writing dirty data/modified data to the memory (during write-back or write-through respectively), etc. Each of the caches use a corresponding snoop filter to snoop and monitor all transactions taking place on the shared bus. The snoop filters track a set of sharer vectors that indicate which caches have the cache lines associated with the data requested in the shared bus. Snoop filters typically track all ways/cache lines under its cache hierarchy. The snoop filter reads the tags for which the transactions are being made, determine whether the corresponding cache includes the tags associated with the bus transaction, and make corresponding changes to the state of the cache lines based on the transactions transmitted through the shared bus. The snoop filter may change the state of cache lines in all lower-level caches. These coherency protocols ensure that modifications to a cache, or cache line thereof, are propagated to other copies of the cache line in the serial order in which they are made. Further, such protocols typically aim to allow only one cache to have permission to write/modify the data, and prevent other caches from having stale copies (unmodified copies) of the data.

In typical valid/invalid coherency protocols, the caches are initialized to an invalid state, and may move to the valid state when the data from the memory is read into one of its cache lines. If the cache line is modified, the cache may transmit a write request (along with a tag associated with the modified data) to the memory, and broadcast the write request to other caches through the shared bus. The other caches may observe the write request, and invalidate the cache lines having the tag provided in the write request. Alternatively, a directory-based cache coherence mechanism can be used in place of the snoop filter, where the cache line addresses being shared by agents in the system are tracked in a common directory that maintains the coherence information between agent caches. The directory acts as a filter through which the processor must ask permission to load data/blocks from the primary memory to its cache. When the cache line is changed/modified, the directory either updates or invalidates the other cache lines having the same tag.

Other coherency protocols, such as MESI or MOESI protocols, have been proposed that minimize the number of transactions or broadcasts made through the shared bus. In MESI and MOESI protocols, the states that the cache lines could be in include a "M" (modified) state, a "S" (shared) state, an "I" (invalid) state, an "O" (owned) state, and an "E" (exclusive) state.

In an invalid state, the cache line may have an invalid copy of the referred data, or no data at all. In an exclusive state, only one of the caches has read the data from the memory thereinto. Cache lines in exclusive state may be readily switched to either the shared state or the modified state. In a shared state, two or more caches store the data. In an owned state, the agents have the responsibility to write the dirty cache lines back to a higher-level of cache or the memory. While the data may be read into other caches, only cache lines in owned state must be written back to the memory. A modified state may indicate that the data in the cache line has been modified, or that the data in the cache line is "dirty." To shift the cache line to the modified state, an exclusive read request may be broadcasted on the shared bus to invalidate other copies of the cache line in the other caches lines, thereby providing exclusive permission to the cache line in the modified state to modify the data.

Initially, all cache lines are in an invalid state. If a first processor reads data from the memory, it may store the data in a first cache line of a first cache and move to an exclusive state. The first cache line may move to a shared state if the data was read and stored in a second cache of a second processor before or after the first processor reads and stores the data in the first cache. The first and second caches may transmit bus read requests through the shared bus, which are snooped by corresponding snoop filters of other caches to modify states of their cache lines.

If the first processor modifies the data in the first cache line, the first cache broadcasts an exclusive read request through the shared bus. In such instances, the first cache shifts the state of the first cache line to the modified state, and the second cache shifts the state of the second cache line to the invalid state. If the second processor subsequently modifies or needs to retrieve the data from the second cache, the second cache may broadcast the read (exclusive) request, and shift the state of the second cache line to the modified state. Since the first cache line is also in the modified state, the first cache broadcasts a bus write request to write the data into the memory, which is then read by the second cache. The first cache line may then be shifted to either the invalid state or the shared state based on whether the second cache transmits a bus read exclusive request or a bus read request, respectively, thereby ensuring that the changes to the data are propagated across all the caches in the order they are made.

When the cache lines are in the exclusive state, implying that the data is stored in only one cache, the cache may not require a write request during write-through or write-back. In such instances, broadcasting the write request can be avoided since cache lines in other caches having the corresponding data are initialized to be invalid, and hence do not require any change in their states. Avoiding the broadcast of the write request improves efficiency of the cache.

Further, multi-level cache systems also maintain an inclusion policy that determines whether higher-level caches should include all cache lines in its lower-level caches. Multi-level caches can implement different inclusion policies, such as inclusive, exclusive, or non-inclusive non-exclusive caches (NINE) policies.

When a multi-level cache system has inclusive policies, all blocks in the lower-level cache are also present in the higher-level cache. In such policies, the higher-level caches are inclusive of the lower-level caches. For example, where the processors maintain L1 and L2 caches, L2 stores all cache lines in L1, among other cache lines. Under the inclusion policy, if a cache miss occurs in L1, but a cache hit occurs in L2, then the requested cache line in L2 is fetched and placed in L1. One or more other cache lines in L1 may be evicted therefrom for placing the requested cache line in L1. Further, if a cache miss occurs in both L1 and L2, the requested data is retrieved from the memory, and placed in both L2 and L1. One or more other cache lines in L2, and corresponding cache lines in L1, are evicted to accommodate the data retrieved from the memory (which is called back invalidation) to prevent violation of inclusion policy.

When multi-level caches have exclusive policies, the lower-level cache contains only blocks that are not present in the higher-level cache. In such policies, lower-level caches are exclusive of the higher-level caches. For example, where the processors maintain L1 and L2 caches, L2 stores cache lines that are not in L1. Under the exclusive policy, if a cache miss occurs in L1, but a cache hit occurs in L2, then the requested cache line in L2 is removed from L2 and placed in L1. One or more of other cache lines in L1 may be evicted therefrom for placing the requested cache line in L1, and the evicted cache line may be placed in L2. L2 may behave like a victim cache under the exclusive policy. Further, if a cache miss occurs in both L1 and L2, the requested data is retrieved from the memory, and placed in L1. The cache lines evicted from L1 are stored in L2, which in turn evicts one or more cache lines therefrom to accommodate the cache lines evicted from L1.

Under NINE policies, none of the aforementioned rules are enforced, and hence cache lines in lower-level caches may or may not be in the higher-level caches. In some examples, if a cache miss occurs in L1, but a cache hit occurs in L2, then the requested cache line in L2 is fetched and placed in L1, similar to the inclusive policies. In such cases, both L1 and L2 may maintain copies of the requested cache line. Further, if a cache miss occurs in both L1 and L2, the requested data is retrieved from the memory, and may be placed in both L2 and L1. However, unlike in inclusive policies, if cache lines are evicted from L2 for inclusion of the requested data, cache lines in L1 remain unaffected (no back invalidation).

While inclusive policies provide shorter miss latency and lower bandwidth in comparison to exclusive and NINE policies, the latter have increased unique memory capacity (given in inclusive policies, there is redundancy of storing data in both lower and higher-levels of caches). Further, NINE policies provide reduced eviction overhead in comparison to the inclusive policies and exclusive policies.

Existing rules for evicting cache lines do not necessarily maintain the selected inclusion policy in multi-level cache systems. Typically, to make room to store additional blocks (e.g., data or instructions copied from the storage device or the memory device), each cache may have a replacement policy that enables the cache to determine when to evict (e.g., remove) particular blocks from the cache. Many replacement policies exist for deciding which position to load the new data block to. A random replacement policy, for instance, places the new data block in any set/block of the cache memory, but increases the probability of the miss rate, as high priority data blocks may be made to leave the cache in such a process. Other policies can include first in, first out (FIFO), which makes the oldest block exit from the cache. Least recently used (LRU) is yet another technique used for block replacement. However, the aforementioned techniques do not guarantee that multi-level cache systems satisfy coherency while also being faithful to the chosen inclusion policy.

Multi-level cache systems, particularly those having greater than two-levels, use the inclusive policies due to difficulty in maintaining coherency. While any one of the inclusion policies can be chosen in multi-level cache systems having 2 processors, most multi-level cache systems having greater than 2 processors typically use inclusive policies rather than exclusive policies or NINE policies. However, inclusive policies may not be desirable as cost of maintaining redundant copies of the cache lines grows exponentially as multi-level cache systems scales. Further, the need for being responsible for maintaining coherency in the child caches presents a challenge for implementing exclusive or NINE policies in multi-level cache systems, particularly at higher levels of caches.

Therefore, there is a need for a method and a system for cache coherency in multi-level cache systems that use, for example, NINE or exclusive policies.

SUMMARY

The present disclosure is directed towards cache coherency management in multi-level cache systems. The present disclosure is further directed to ensure multi-level cache systems remain faithful to chosen inclusion policies (such as non-inclusive non-exclusive (NINE) policy) during cache coherency operations. The present disclosure further provides means for handling victim line selection from lower-level caches during cache coherency operations.

Aspects of the present disclosure include a method for cache coherency management in a multi-level coherent system. The method includes, for occurrence of a conflict eviction from a set of a cache at a first level (such as L3 caches, for example) from the multi-level coherent system, selecting a victim line from the set of the cache for eviction. For the victim line being dirty and a second level (such as L2 caches, for example) from the multi-level coherent system having a copy of the victim line, the method includes writing data to a third level (such as L4 caches, for example) from the multi-level coherent system using a cache maintenance operation, and silently dropping the victim line without notification to the third level. In some embodiments, the second level is a level directly lower than the first level, and the third level is a level directly higher than the first level.

Aspects of the present disclosure include a system having a control circuit that is configured to execute instructions for executing a process. Another aspect of the present disclosure includes a non-transitory computer readable storage medium having instructions for executing a method. The instructions may involve cache coherency management in a multi-level cache system using the aforementioned method.

BRIEF DESCRIPTION OF THE DRAWINGS

FIG. 2(*b*) illustrates interactions between processor and cache through address and data lines.

DETAILED DESCRIPTION

Figure 1A:
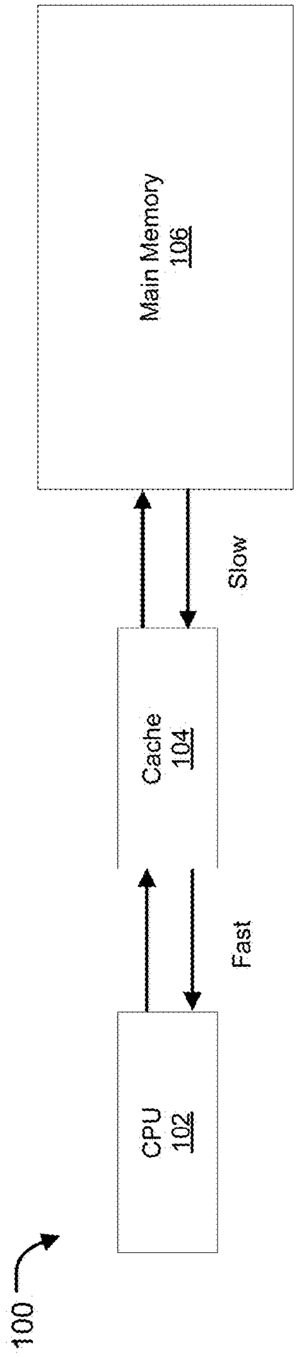
FIG. 1(*a*) and FIG. 1(*b*) illustrate example cache memory architectures, respectively, showing placement of cache memory in a hardware layout.
Figure 1B:
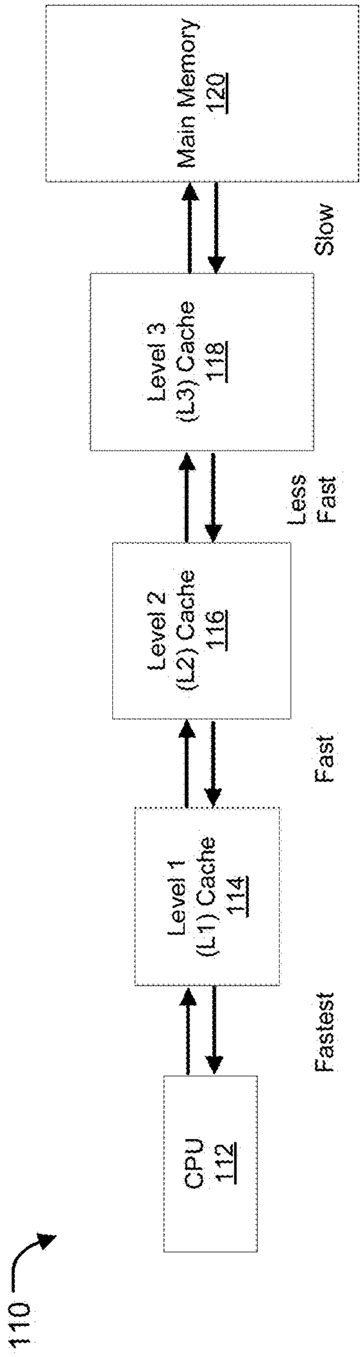
Figure 2A:
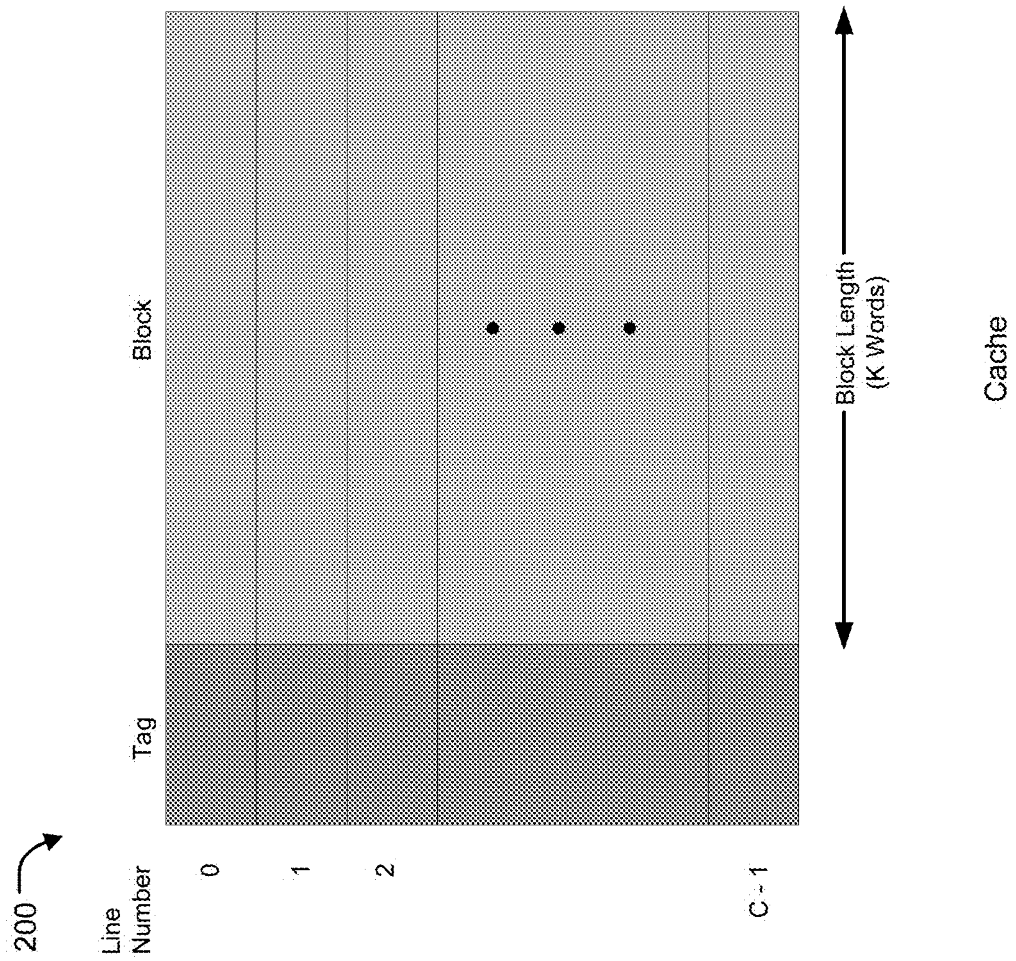
FIG. 2(*a*) illustrates structural layout of cache memory.
Figure 2B:
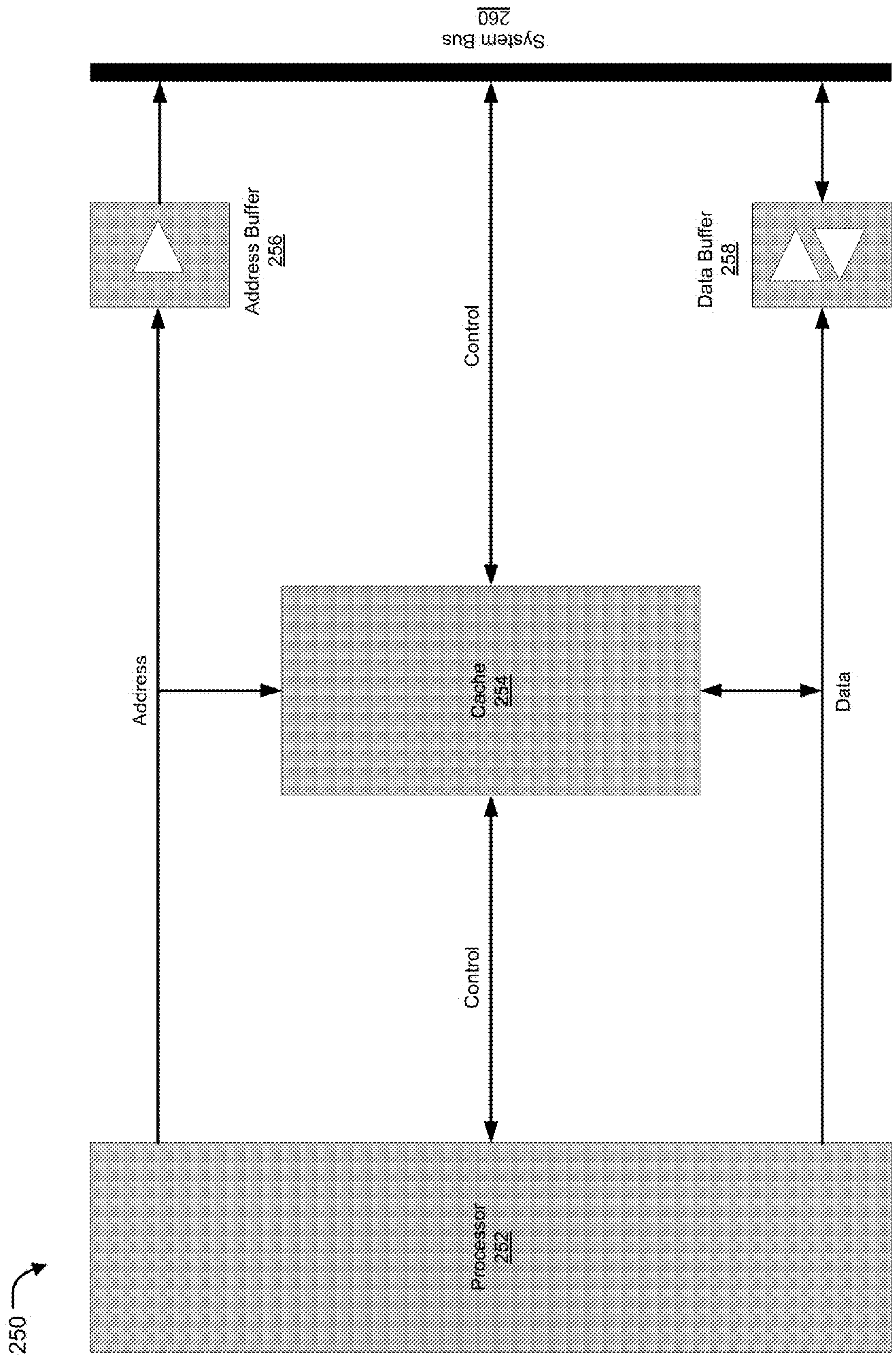

The following detailed description provides further details of the figures and example implementations of the present disclosure. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present disclosure.

The present disclosure describes a system and a method for cache coherency operations in multi-level cache systems. The present disclosure is further directed to ensure multi-level cache systems remain faithful to chosen inclusion policies (such as non-inclusive non-exclusive (NINE) policy) during cache coherency operations. The present disclosure further provides means for handling victim line selection from lower-level caches during cache coherency operations.

Figure 3:
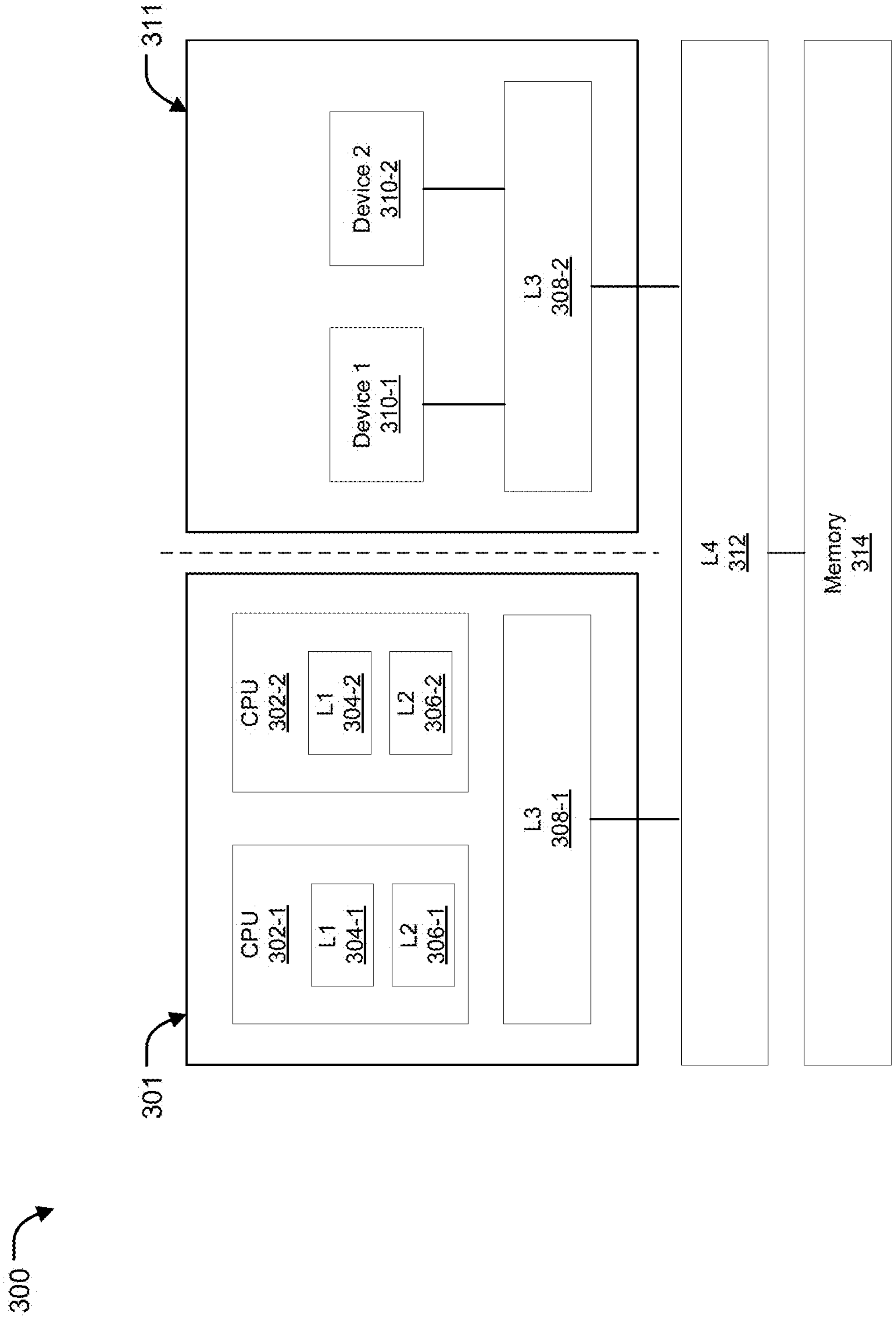
FIG. 3 illustrates an example architecture of a multi-level cache system.

In an embodiment, the present disclosure provides a method 400 of cache coherence management in a multi-level cache system. The method 400 may be implemented on a multi-level cache system having the architecture 300 shown in FIG. 3. As shown, the architecture 300 may include one or more processors/processing elements, such as Central Processing Units (CPUs) agents 302-1, 302-2, and devices 310-1, 310-2. The devices 310-1, 310-2 may be computing devices/computing units indicative of microprocessors, Graphical Processing Unit (GPUs), controllers, digital signal processors, electronic circuits, and so on, or processing elements associated therewith. In some embodiments, the computing devices/units may have one or more cores.

In some embodiments, each of the processors 302-1, 302-2 may include a corresponding L1 cache and L2 cache, such as L1 cache 304-1, 304-2 and L2 cache 306-1, 306-2. In some examples, L1 304 may be implemented as registers on the processor, or as an on-chip Static Random Access Memory (SRAM). In some examples, L2 306 may be implemented as dedicated SRAM. In some embodiments, L1 and L2 may be associated with a single processor. The L2 may be connected to an L3, such as an L3 cache 308-1. The L3 may be implemented in an SRAM. The L3 may have larger capacity than L2. In some embodiments, the L3 cache 308-1 may be configured to exchange data directly with memory 314, or through L4 such as an LA cache 312. The memory 314 may be implemented on a Dynamic RAM (DRAM). The L4 cache 312 may also be configured to exchange data with L3 cache 308-2, which in turn is connected to caches in devices 310-1, 310-2 that form a network 311. The network 311 may include cores, agents, processors/processing elements, or any combination thereof, but not limited thereto. Throughout the specification, caches at levels higher thereto are referred to as higher-level caches (for example, L4 is a higher-level cache with respect to L3), and caches at levels lower thereto are referred to as lower-level caches (for example, L2 and L1 are lower-level caches with respect to L3).

In some embodiments, the architecture 300 may include a clusters of caches at each level (such as, L3 caches 308-1, 308-2 forming a cluster). The caches may be connected using an interconnect, such as a Network on Chip (NoC), or other interconnects known to those in the art. The multi-level cache system may ensure cache coherency at each level of the fabric. The present disclosure provides the method 400 that allows the multi-level cache system to maintain coherency throughout the fabric/clusters of caches while complying with a NINE/exclusive inclusion policy.

In some embodiments, the method 400 may be executed/triggered upon occurrence of a conflict eviction. When a cache miss is encountered and data/blocks are retrieved from the memory, such as memory 314, or higher-level caches, such as L4 cache 312, the retrieved data may have to be stored in a cache line of a cache, such as L3 cache 308. Policies for selecting the cache line/way to be used for storing the retrieved data may be any one of direct mapping or associative mapping. If the cache lines selected as per the policy already have data stored therein, then a conflict eviction occurs. During conflict evictions, the retrieved data is stored in the cache line, and the data stored previously therein (or victim line) is moved to a victim cache, a higher-level, or the memory, or dropped. In some embodiments, dropping the cache line/victim line may include removing or discarding the cache line. Typically, the victim line is selected using an eviction policy such as least recently used (LRU) policy, least frequently used (LFU) policy, and so on.

However, as explained in the background, if lower-level caches maintain copies of the victim line, then corresponding cache lines therein also have to be removed to prevent the snoop filter of higher-level caches from being inaccurately updated. Such situations would force the multi-level cache system to use the inclusive policy, which may not be desirable. Further, continuing the multi-level cache system to operate with the NINE policy may risk incoherency in the caches.

Figure 4:
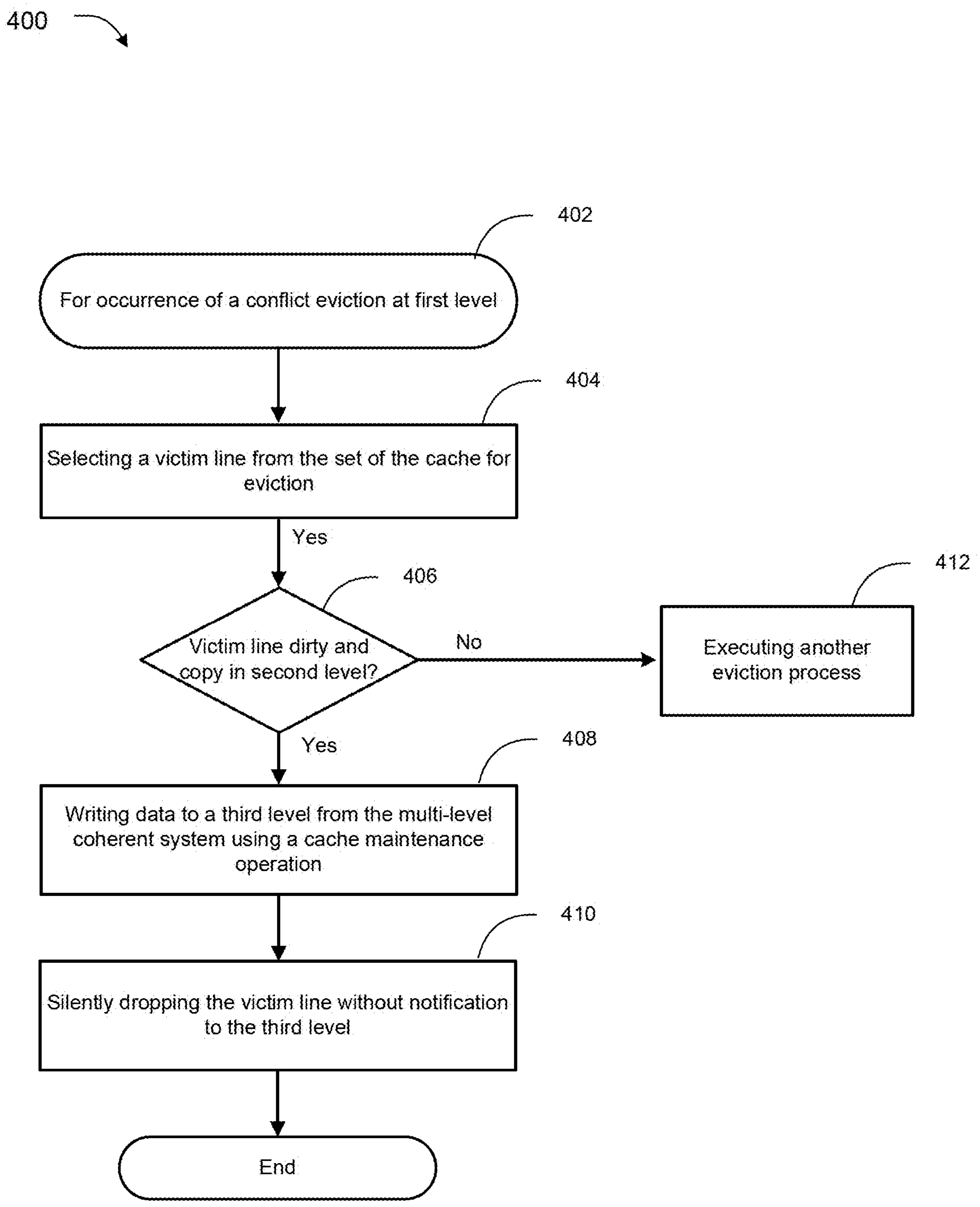
FIG. 4 illustrates an example flow diagram of a method for cache coherence management in a multi-level cache system.

As shown in FIG. 4, at block 402, the method 400 is triggered upon occurrence of a conflict eviction from a set of a cache at a first level from the multi-level coherent system. In some examples, the set of caches may include the caches L1 304, L2 306, L3 308, and L4 312. While the forthcoming examples describe the method 400 where the first level corresponds to L3 cache 308 from the set of caches, it may be appreciated by those skilled in the art that the first level may correspond to any other cache from the set of caches. On occurrence of the conflict eviction, the method 400 may proceed to block 404, where the method 400 includes selecting a victim line from the set of the cache for eviction.

In some embodiments, the selected victim line may be dirty, and a copy thereof may be present in the second level. At block 406, if the victim line is dirty, and a second level (such as L2 cache, for example) from the multi-level coherent system has a copy of the victim line, the method 400 includes performing blocks 408 and 410. In some embodiments, the second level is a level that is directly/one level lower than the first level. At block 408, the method 400 includes writing data to a third level (such as LA cache, for example) from the multi-level coherent system using a cache maintenance operation. In some embodiments, the third level is a level that is directly/one level higher than the first level. In some embodiments, the cache maintenance operation may be an internally generated cache instruction. In such embodiments, the cache maintenance operation may be generated by the cache independently of the processors. In some examples, the cache maintenance operation may be a CleanShared cache maintenance instruction. In such examples, the CleanShared operation may write the dirty data in the victim line to the higher-level cache, thereby making the data clean with respect to the higher-level cache, and not requiring the corresponding snoop filter of the first level to be updated.

At block 410, the method 400 includes silently dropping the victim line without notification to the third level. In such embodiments, the snoop filter is not updated, thereby allowing the snoop filter to track the copy in the second level to maintain cache coherency. By writing the victim line to the higher-level caches and silently dropping the victim line, the multi-level coherent system may maintain cache coherency across the fabric/cluster of caches and maintain an exclusive policy or a NINE policy. Further, in such embodiments, the state of the copy in the second level may remain Shared(S), while the state of the victim line may be shifted from Modified or Owned (M/O) state to “S” state when the data therein is written to the third level, and then to Invalid (I) state when dropped.

While the method 400 executes blocks 408 and 410 when the victim line is dirty and a copy thereof is in the second level (as determined at block 406), it may be preferred to evict lines that are clean or not present in the second level. In some implementations, the method 400 may be biased to select ‘clean lines’ in the first level as the victim line. In some embodiments, the method 400 may include prioritizing selection of lines from the set of cache that are ‘clean’, and are ‘not in the second level’. In some embodiments, for selecting the victim line, a policy may be implemented that prioritizes the cache line being clean or not being in the second level over LRU, LFU, or the like.

In some embodiments, for selecting the victim line from the set of the cache for eviction, the method 400 may include searching for lines that are ‘clean’, and for which ‘the second level does not have a copy’. In some examples, the cache lines in the second level may be exclusive of the cache lines in the first level. In such embodiments, the method 400 may include selecting the victim line from the found lines that are clean or for which the second level does not have a copy. Further, the method 400 may include writing the victim line to the higher-level caches. In other embodiments, for selecting the victim line from the set of the cache for eviction, the method 400 may include searching for lines that are ‘clean’ and for which ‘the second level has a copy’. In such embodiments, the method 400 may include selecting the victim line from the lines that are clean and for which the second level has a copy. In further embodiments, for selecting the victim line from the set of the cache for eviction, the method 400 may include searching for lines that are ‘dirty’ and for which ‘the second level has a copy’. In such embodiments, the method 400 may include selecting the victim line from the found lines that are dirty and for which the second level has a copy.

When victim lines selected at block 404 are either clean (i.e. not dirty), or if the second level does not have a copy of the victim line, or both, the method 400 proceeds to block 412 where another eviction process is executed. The determination as to whether the victim line is dirty, and whether it is present in the second level may be made at block 406. For example, if the victim line selected is dirty, but not present in the second level, then a normal write back is executed/sent to the third level. In other examples where the victim line is present at the second level, but is not dirty (or is clean), then the victim line is silently dropped. The victim selection policies, as described above, may be chosen based on the requirements of the multi-level cache coherent system.

The method 400, therefore, ensures cache coherency across all levels of the multi-level cache system, while allowing it to implement NINE inclusion policies. Ensuring the same allows the multi-level cache systems to optimize space utilization of the caches, while reducing the number of transactions required to maintain coherency, in comparison to existing solutions that use inclusive policy in multi-level cache systems.

In another aspect of the present disclosure, a multi-level coherent system with cache coherency management may include a control circuit (not shown). The control circuit may be configured to implement the method 400 for cache coherence management. In still another aspect of the present disclosure, a non-transitory computer readable medium stores instructions for cache coherency management in a multi-level coherent system. The instructions correspond to the method 400.

Figure 5:
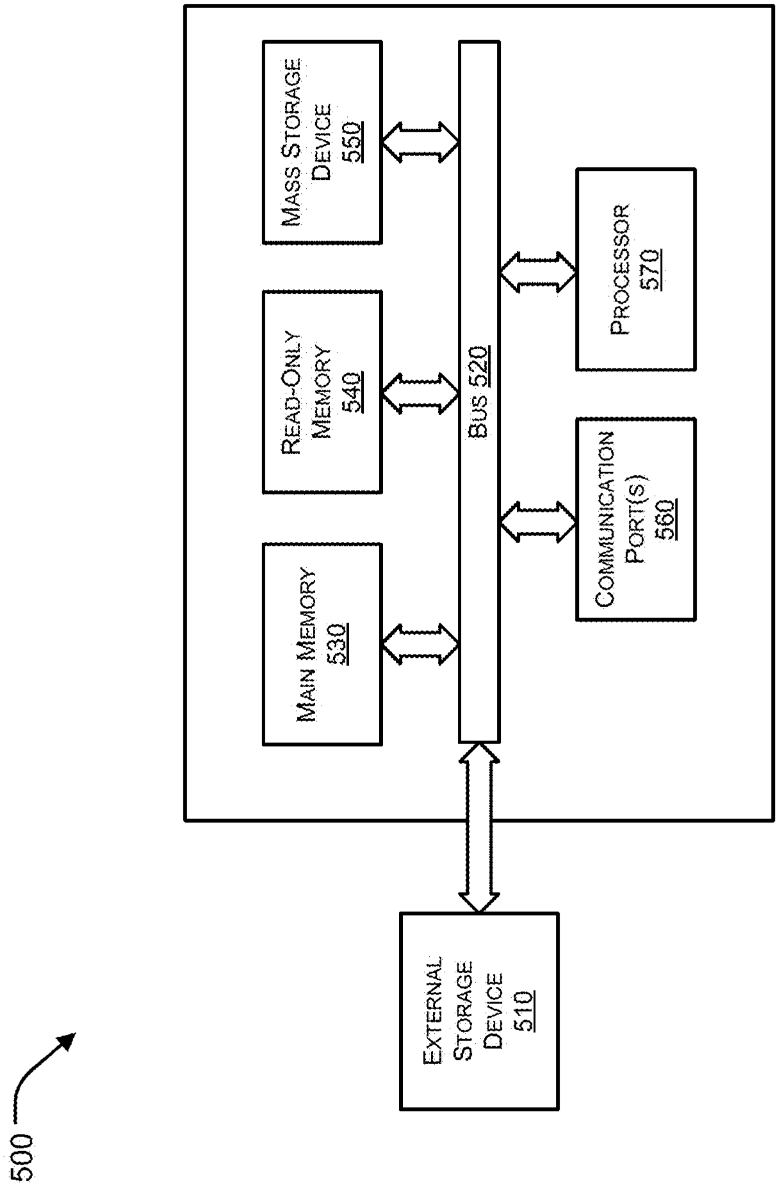
FIG. 5 illustrates an example computer system in which or with which embodiments of the system may be implemented.

Referring to FIG. 5, the block diagram represents a computer system 500 that includes an external storage device 510, a bus 520, a main memory 530, a read only memory 540, a mass storage device 550, a communication port 560, and a processor 570. A person skilled in the art will appreciate that the computer system 500 may include more than one processor 570 and communication ports 560. The processor 570 may include various modules associated with embodiments of the present disclosure. The communication port 560 may be any of a Recommended Standard 232 port for use with a modem-based dialup connection, a 10/100 Ethernet port, a Gigabit or 10 Gigabit port using copper or fiber, a serial port, a parallel port, or other existing or future ports. The communication port 560 may be chosen depending on a network, such as a Local Area Network (LAN), a Wide Area Network (WAN), or any network to which computer system 500 connects.

In an embodiment, the memory 530 may be a RAM, or any other dynamic storage device commonly known in the art. The Read-Only Memory (ROM) 540 may be any static storage device(s) e.g., but not limited to, a Programmable Read-Only Memory (PROM) chip for storing static information. The mass storage 550 may be any current or future mass storage solution, which may be used to store information and/or instructions. Exemplary mass storage solutions may include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), one or more optical discs, Redundant Array of Independent Disks (RAID) storage, e.g., an array of disks (e.g., SATA arrays).

In an embodiment, the bus 520 communicatively couples the processor(s) 570 with the other memory, storage, and communication blocks. The bus 520 may be, e.g., a Peripheral Component Interconnect (PCI)/PCI Extended (PCI-X) bus, Small Computer System Interface (SCSI), USB, or the like, for connecting expansion cards, drives, and other subsystems as well as other buses, such a front side bus (FSB), which connects the processor 570 to the computer system 500. In other embodiments, the computer system 500 may include a NoC to allow communication between the processing elements and memory elements thereof.

In another embodiment, operator and administrative interfaces, e.g., a display, keyboard, and a cursor control device, may also be coupled to the bus 520 to support direct operator interaction with computer system 500. Other operator and administrative interfaces may be provided through network connections connected through communication port 560. In some embodiments, the external storage device 510 may be any kind of external hard-drives, floppy drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system 500 limit the scope of the present disclosure.

These algorithmic descriptions and symbolic representations are the means used by those skilled in the data processing arts to most effectively convey the essence of their innovations to others skilled in the art. An algorithm is a series of defined operations leading to a desired end state or result. In the example implementations, the operations carried out require physical manipulations of tangible quantities for achieving a tangible result.

Moreover, other implementations of the present disclosure will be apparent to those skilled in the art from consideration of the specification and practice of the example implementations disclosed herein. Various aspects and/or components of the described example implementations may be used singly or in any combination. It is intended that the specification and examples be considered as examples, with a true scope and spirit of the application being indicated by the following claims.

What is claimed is:

1. A method for cache coherency management in a multi-level coherent system, comprising:
- for occurrence of a conflict eviction from a set of a cache at a first level from the multi-level coherent system:
  - selecting a victim line from the set of the cache for eviction;
  - for the victim line being dirty and a second level towards a requestor from the multi-level coherent system having a copy of the victim line:
    - writing dirty data of the victim line from the first level to a third level towards memory from the multi-level coherent system using a cache maintenance operation configured to write the dirty data of the victim line to the third level without execution of a snoop filter update; and
    - silently dropping the victim line without notification to the third level.

2. The method of claim 1, wherein the second level is a level that is directly lower than the first level.

3. The method of claim 1, wherein the third level is a level that is directly higher than the first level.

4. The method of claim 1, wherein the selecting the victim line from the set of the cache for eviction comprises:
- searching for lines that are dirty and for which the second level has a copy; and
- for the lines that are dirty and for which the second level has a copy being found from the searching, selecting the victim line from the found lines that are dirty and for which the second level has a copy.

5. The method of claim 1, wherein the selecting the victim line from the set of the cache for eviction comprises:
- searching for lines that are clean or for which the second level does not have a copy; and
- for the lines that are clean or for which the second level does not have a copy being found from the searching, selecting the victim line from the found lines that are clean or for which the second level does not have a copy.

6. The method of claim 1, wherein the selecting the victim line from the set of the cache for eviction comprises:
- searching for lines that are clean and for which the second level has a copy; and
- for the lines that are clean and for which the second level has a copy being found from the searching, selecting the victim line from the lines that are clean and for which the second level has a copy.

7. The method of claim 1, further comprising, for the victim line not being dirty or for the second level from the multi-level coherent system not having a copy of the victim line, executing another eviction process.

8. A non-transitory computer readable medium, storing instructions for cache coherency management in a multi-level coherent system, the instructions comprising:
- for occurrence of a conflict eviction from a set of a cache at a first level from the multi-level coherent system:
  - selecting a victim line from the set of the cache for eviction;
  - for the victim line being dirty and a second level towards a requestor from the multi-level coherent system having a copy of the victim line:
    - writing dirty data of the victim line from the first level to a third level towards memory from the multi-level coherent system using a cache maintenance operation configured to write the dirty data of the victim line to the third level without execution of a snoop filter update; and
    - silently dropping the victim line without notification to the third level.

9. The non-transitory computer readable medium of claim 8, wherein the second level is a level that is directly lower than the first level.

10. The non-transitory computer readable medium of claim 8, wherein the third level is a level that is directly higher than the first level.

11. The non-transitory computer readable medium of claim 8, wherein the selecting the victim line from the set of the cache for eviction comprises:

searching for lines that are dirty and for which the second level has a copy; and for the lines that are dirty and for which the second level has a copy being found from the searching, selecting the victim line from the found lines that are dirty and for which the second level has a copy.

12. The non-transitory computer readable medium of claim 8, wherein the selecting the victim line from the set of the cache for eviction comprises:

searching for lines that are clean or for which the second level does not have a copy; and for the lines that are clean or for which the second level does not have a copy being found from the searching, selecting the victim line from the found lines that are clean or for which the second level does not have a copy.

13. The non-transitory computer readable medium of claim 8, wherein the selecting the victim line from the set of the cache for eviction comprises:

searching for lines that are clean and for which the second level has a copy; and for the lines that are clean and for which the second level has a copy being found from the searching, selecting the victim line from the lines that are clean and for which the second level has a copy.

14. The non-transitory computer readable medium of claim 8, further comprising, for the victim line not being dirty or for the second level from the multi-level coherent system not having a copy of the victim line, executing another eviction process.

15. A multi-level coherent system with cache coherency management, comprising:

a control circuit, configured to:

for occurrence of a conflict eviction from a set of a cache at a first level from the multi-level coherent system:

select a victim line from the set of the cache for eviction;

for the victim line being dirty and a second level towards a requestor from the multi-level coherent system having a copy of the victim line:

write dirty data of the victim line from the first level to a third level towards memory from the multi-level coherent system using a cache maintenance operation configured to write the dirty data of the victim line to the third level without execution of a snoop filter update; and silently drop the victim line without notification to the third level.

* * * * *